US011756452B2

(12) United States Patent
Lebovic et al.

(10) Patent No.: US 11,756,452 B2
(45) Date of Patent: Sep. 12, 2023

(54) ONCOPLASTIC SURGERY TRAINING MODEL

(71) Applicant: Silicon Valley Innovations, Inc., Reno, NV (US)

(72) Inventors: Gail S. Lebovic, Reno, NV (US); Steven N. Grolle, Los Altos, CA (US); Michael J. Drews, Palo Alto, CA (US); George D. Hermann, Los Altos Hills, CA (US)

(73) Assignee: Silicon Valley Innovations, Inc., Reno, NV (US)

( * ) Notice: Subject to any disclaimer, the term of this patent is extended or adjusted under 35 U.S.C. 154(b) by 0 days.

(21) Appl. No.: 17/482,368

(22) Filed: Sep. 22, 2021

(65) Prior Publication Data

US 2022/0093009 A1   Mar. 24, 2022

Related U.S. Application Data

(60) Provisional application No. 63/082,175, filed on Sep. 23, 2020.

(51) Int. Cl.
*G09B 23/34* (2006.01)

(52) U.S. Cl.
CPC .................................. *G09B 23/34* (2013.01)

(58) Field of Classification Search
CPC ...................................................... G09B 23/34
USPC ......................................................... 434/267
See application file for complete search history.

(56) References Cited

U.S. PATENT DOCUMENTS

| 8,568,146 | B2 | 10/2013 | Glicksman |
| 2011/0207104 | A1* | 8/2011 | Trotta .................... G09B 23/30 521/154 |
| 2012/0264097 | A1 | 10/2012 | Newcott et al. |
| 2017/0065403 | A1 | 3/2017 | Al-Jasim |
| 2018/0022018 | A1* | 1/2018 | Cambridge ......... B29C 33/3835 264/308 |

OTHER PUBLICATIONS

International Search Report dated Jan. 19, 2022, for PCT Application No. PCT/US2021/051609, filed on Sep. 22, 2021, 2 pages.
Written Opinion of the International Searching Authority dated Jan. 19, 2022, for PCT Application No. PCT/US2021/051609, filed on Sep. 22, 2021, 5 pages.

* cited by examiner

*Primary Examiner* — Kesha Frisby
(74) *Attorney, Agent, or Firm* — Cooley LLP

(57) ABSTRACT

Described herein are anatomical models for medical training, surgical planning, or patient demonstration. The anatomical models include a replica of a target body part that may be altered, unfinished, or deformed so that an anatomical component may be attached thereto to complete the replica and provide visual training with respect to symmetry and other aspects of medical or surgical procedures. For example, the anatomical models may be altered, unfinished, or deformed to simulate a post-surgical deformity. Systems and methods including the anatomical models are also described herein.

23 Claims, 17 Drawing Sheets

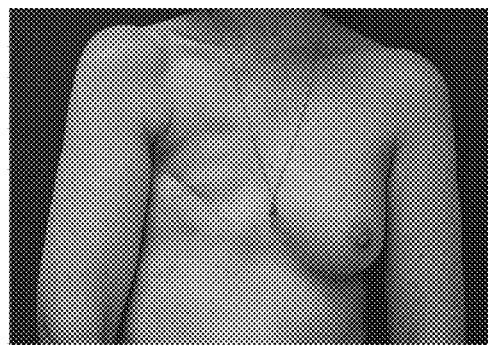
FIG. 8A　　　　　　　　　　　FIG. 8B
FIG. 8C　　　　　　　　　　　FIG. 8D

ONCOPLASTIC SURGERY TRAINING MODEL

CROSS-REFERENCE TO RELATED APPLICATIONS

This application claims priority to U.S. Provisional Application Ser. No. 63/082,175 filed on Sep. 23, 2020, which is hereby incorporated by reference in its entirety.

FIELD

This application relates to anatomical models for medical training or patient demonstration. The anatomical models include a replica of a target body part, but may be physically altered in a manner that simulates a deformity so that an anatomical component may be attached thereto to complete the replica and provide visual training with respect to symmetry and other aspects of medical or surgical procedures. Systems and methods including the anatomical models are also described herein.

BACKGROUND

Every year, hundreds of thousands of women around the world are diagnosed with breast cancer. While breast conservation has increased in numbers, there are still many women who are treated with mastectomy (removal of the entire breast). Unfortunately, mastectomy often leaves women cosmetically deformed, which in turn dramatically impacts their body image and quality of life. In the United States, there are few surgeons trained in the art of breast reconstruction. Thus, there is a large need to train additional surgeons to be able to provide breast reconstruction services. Although breast reconstruction has been available since the 1980's, these procedures are still relatively rare, with studies indicating that roughly only 20% of women undergoing mastectomy have immediate breast reconstruction at the time the breast is surgically removed.

Additionally, over the past several decades, there has been an effort to try and offer breast conserving surgery to more women since roughly 60% of breast cancers are now found at an early stage using screening mammography. For those women who are able to save their breast, studies indicate there is a large proportion of women who suffer from poor surgical outcomes after these procedures. In fact, more than 30% of women who save their breast report a poor aesthetic outcome. Many of these women have more than one operation in an attempt to improve surgical deformities that occur from removal of the tumor. Additionally, these deformities can be compounded by severe scarring secondary to the radiation therapy required in most cases when the breast is preserved. These poor cosmetic outcomes resulting after surgery of the breast, are often difficult, if not impossible to correct and thus, many women are left permanently scarred and deformed.

In both the case of mastectomy and breast conserving surgery, the psychosocial impact on women relating to breast deformity may be quite significant. In the late 1980's a number of surgeons realized this difficult situation and began practicing new techniques known as oncoplastic surgery. These procedures are designed to take many factors into consideration when planning breast surgery, including the size, shape, and structure of the breast in its pre-operative form. Also, the size, location, and type of tumor may be important to consider when deciding how much volume should be removed from the breast. These factors often determine the specific surgical procedure that will be completed. The location of the surgical incisions is another key factor to be considered. However, although scarring is a concern of most women, several studies have shown that symmetry is the single most important factor to a patient's acceptance and happiness following breast surgery.

In general, the planning involved with breast surgery first involves a complete analysis of the cancer using imaging and biopsy techniques to determine the exact nature of the tumor within the affected breast. Various factors about the tumor such as the size (volume), the location or quadrant within the breast, the distance from the nipple-areolar complex, the proximity to the axilla, etc., are determined. Next, the type of procedure is considered, including a determination of whether mastectomy or breast conservation is the best option. The surgical approach and location of the incision(s) is determined and the decision regarding the type of reconstruction is analyzed and discussed in great detail with the patient. Additionally, the unaffected breast is thoroughly analyzed as well to make sure it is free of cancer and to discuss with the patient how she feels about the size, shape and appearance of her breasts. An extensive discussion regarding the risks, complications, and options is completed before the surgical plan is finalized. However, surgical planning can be a very difficult task without any visual tools to assist the surgeon or the patient in obtaining a clear understanding of the patient's desire for the aesthetic outcome and overall appearance of the breast(s). For decades these difficult decisions and conversations have taken place in a vacuum of information for both the surgeon and the patient. Surgical planning is often quite challenging without the availability of a three-dimensional model or simulator for the surgeon to work with in order to visualize the most appropriate and optimal surgical approach.

Accordingly, systems and methods for improving oncoplastic (as well as other) surgical training, planning, and techniques would be useful. More specifically, systems and methods for improving a surgeon's ability to provide better cosmetic outcomes of breast surgery, for example, by maintaining breast symmetry, would be beneficial.

SUMMARY

Described herein are anatomical models for medical training, surgical planning, or patient demonstration. The anatomical models include a replica of a target body part, but may be altered, unfinished, or deformed in a manner that replicates a deformity, e.g., a post-surgical deformity, so that an anatomical component may be attached thereto to complete or reform the replica and provide visual training with respect to symmetry and other aspects of medical or surgical procedures. Systems and methods including the anatomical models are also described herein.

More specifically, the anatomical models may be used to assist in training surgeons in the skill and art of breast reconstruction, breast conservation, and breast restructuring. In addition to breasts, the models may represent other body parts that require an aesthetic planning aspect to the procedure, for example, those procedures on the face or nose, or other procedures where symmetry is desirable. The models may be used to visually train surgeons in several aspects of pre-surgical planning. For example, the models may help train surgeons visualize the optimal place to make an incision, where volume may be removed, where tissue rearrangements may be able to assist with achieving symmetry, etc. Furthermore, the surgeons may use the models to practice various techniques manually, which helps to imprint these surgical principles in their mind as well as demonstrate to patients various procedures that could be done to achieve certain outcomes.

In general, the anatomical models described herein comprise a three-dimensional replica of a human body part. The three-dimensional replica may include a mounting area in an altered, unfinished, or deformed portion thereof, where the replica may be configured for completion or reforming by attaching a simulated anatomical component of the body part to the mounting area. The body part may be a female torso and the simulated anatomical component, a breast. The anatomical models may also include other body parts and simulated anatomical components. In some variations, the mounting area may be configured for removable attachment of the anatomical component. In other variations, the simulated anatomical component may be configured for sculpting onto the mounting area. In one variation, the anatomical model is configured for breast surgery training and demonstration. Here, the three-dimensional replica may include a female torso having an altered or unfinished portion simulating the post-surgical changes seen after mastectomy, where the replica may be configured for completion by sculpting a simulated breast onto the mounting area.

Systems for modeling a body part are also described herein. The systems generally include an adjustable base and a three-dimensional replica of the body part for coupling to the adjustable base, where the three-dimensional replica may include a mounting area in an altered, unfinished, or deformed area of the three-dimensional replica. One or more materials may be included in the systems and be configured to simulate an anatomical component of the body part. The systems may further include a mechanism for altering the angle of the adjustable base with respect to a working surface, for example, a hinge, ratcheting mechanism, or telescoping tube. The body part may be a female torso and the simulated anatomical component, a breast. The anatomical models may also include other body parts and simulated anatomical components.

Further described herein are methods related to using the anatomical models for training and patient demonstration. In general, the methods may include creating a three-dimensional replica of a body part, where the three-dimensional replica includes a mounting area in an altered, unfinished, or deformed portion thereof. The replica may be completed or reformed by attaching a first simulated anatomical component of the body part to the mounting area. The simulated anatomical component may be a breast, but other anatomical components may be employed. In some instances, attachment of the first simulated anatomical component may be achieved by sculpting the component onto the mounting area. In other instances, the method may include interchanging the first simulated anatomical component with a second simulated anatomical component having a different size, a different shape, or a combination thereof.

The anatomical models may be used during breast surgery planning, for visual training of anatomical assessment, e.g., assessment for symmetry, for visual training relating placement of surgical incisions, determining the surgical approach for tumor removal, reconstruction, or restructuring of the breast, or for visual training relating to breast implant placement. The anatomical models may also be used for patient demonstration, as a tool to illustrate various procedures to achieve certain outcomes.

BRIEF DESCRIPTION OF THE DRAWINGS

In FIGS. 1A and 1B, the simulated anatomical component (a breast) is removably attached to a mounting area of the anatomical model; and in FIGS. 1C and 1D, the simulated anatomical component is sculpted onto the mounting area of the anatomical model.

FIG. 5A is a front view of the system; and FIG. 5B is a perspective view of the system.

FIGS. 8A-8D depict various deformities as a result of breast surgery.

DETAILED DESCRIPTION

Figure 1A:
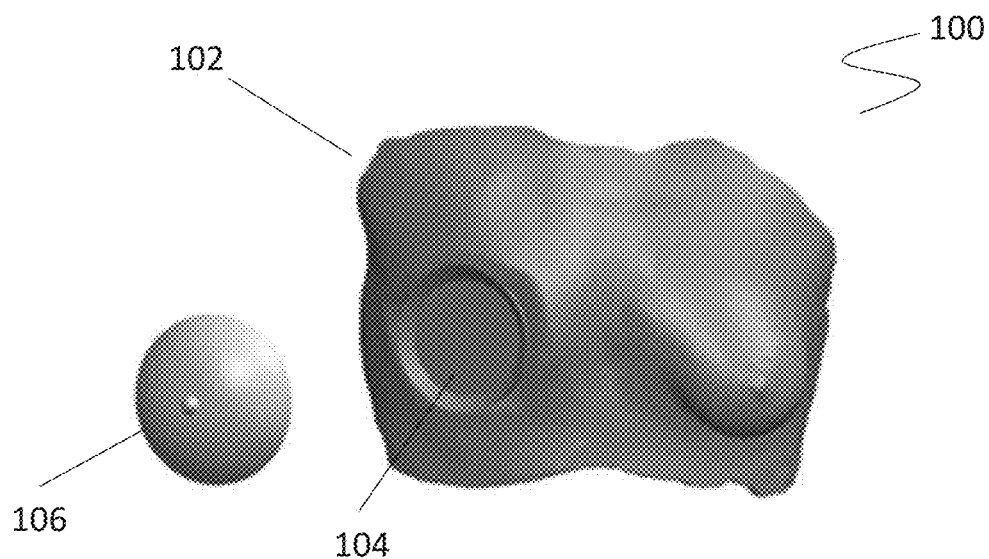
FIGS. 1A-1D depict exemplary simulated anatomical components attached to an anatomical model.

Described herein are anatomical models for medical training, surgical planning, or patient demonstration. As previously stated, the anatomical models may include a replica of a target body part, but may be altered, unfinished, or deformed (e.g., in a manner that simulates post-operative surgical changes), and so that an anatomical component may be attached thereto to complete or reform the replica and provide visual training with respect to symmetry and other aspects of medical or surgical procedures (e.g., placement of surgical incisions, various anatomical planes, etc.). The anatomical models may be useful in the field of breast surgery. After mastectomy or breast conserving surgery, breast deformities may be quite significant. FIGS. 8A-8D illustrate the various deformities that may result from mastectomy (FIG. 8A) and breast conserving surgeries (FIGS. 8B-8D). The anatomical models described herein may be useful in training surgeons so that cosmetic outcomes may be improved, as well as functioning as a demonstrative and educational tool to prepare patients on what to expect from certain breast procedures.

Systems and methods including the anatomical models are also described herein. The systems generally include an anatomical model, an adjustable base to which the anatomical model is attached, and one or more simulated anatomical components for removable attachment to the anatomical model, or one or more materials that may be used to create a simulated anatomical component of the body part. Furthermore, the systems may be configured for easy mounting to a variety of working surfaces and adjustment to various viewing angles. The systems may be portable, and thus in some instances may be sized to be packable.

Anatomical Models and Simulated Anatomical Components

In some variations, the anatomical models described herein comprise a three-dimensional replica of a human body part. The three-dimensional replica may be representative of various human body parts, including without limitation, a female or male torso, a face, a head, feet, hands, etc. Replicas of other body parts are also contemplated. In one variation, the anatomical model may be a three-dimensional replica of a female torso.

The replicas may include a mounting area in an altered, unfinished or deformed portion thereof, where the replica may be configured for completion or reforming by attaching a simulated anatomical component of the body part to the mounting area. The simulated anatomical component may represent a human anatomical component, and will typically depend on the body part for which the replica is being made. For example, the simulated anatomical component may be a breast, an ear, a nose, a jaw, fingers, toes, etc. Other simulated anatomical components may be used.

In some variations, the mounting area may be configured for removable attachment of the simulated anatomical component so that different simulated anatomical components, for example, components having a different size or shape, may be interchanged. Here, the simulated anatomical component may be provided as a pre-formed part and then attached to the anatomical model, or shaped and/or sized by a user and then attached to the model. A base plate may be used as an intermediate element in these variations to aid in attachment of the simulated anatomical component to the model. For example, the simulated anatomical component may be coupled to a base plate and the base plate attached to the mounting area of the anatomical model. Attachment mechanisms such as, but not limited to, Velcro® fasteners, hooks, snaps, magnets, and slot-in type attachments may also be employed to attach the base plate to the mounting area.

In other variations, the simulated anatomical component may be configured for sculpting onto the mounting area. The simulated anatomical component may first be attached to the mounting area of the body part replica and then shaped, sized, and/or positioned to complete an unfinished replica, or to fix or reform a deformity in the replica. For example, the simulated anatomical component may be used to complete an unfinished replica made to represent a mastectomy patient. In another variation, the simulated anatomical component may be used to reform a deformity in a replica made to represent a divot in a breast due to a breast biopsy.

The anatomical models and simulated anatomic components may be made from various materials. In one variation, the anatomical models and simulated anatomic components may be made from a thermoplastic polymer. Exemplary thermoplastic polymers include without limitation, acrylic, acrylonitrile butadiene styrene (ABS), polyamide, polycarbonate, polyester, polyethylene, polypropylene, polystyrene, polyurethane, or derivatives or combinations thereof. Other materials such as silicones and rubbers may also be used. When the simulated anatomical component is sculpted onto the mounting area, the component may be made from a clay-based or other malleable material. The clay-based material may be a polymer clay (modelling clay), a water-based clay, or an oil-based clay.

Figure 1B:
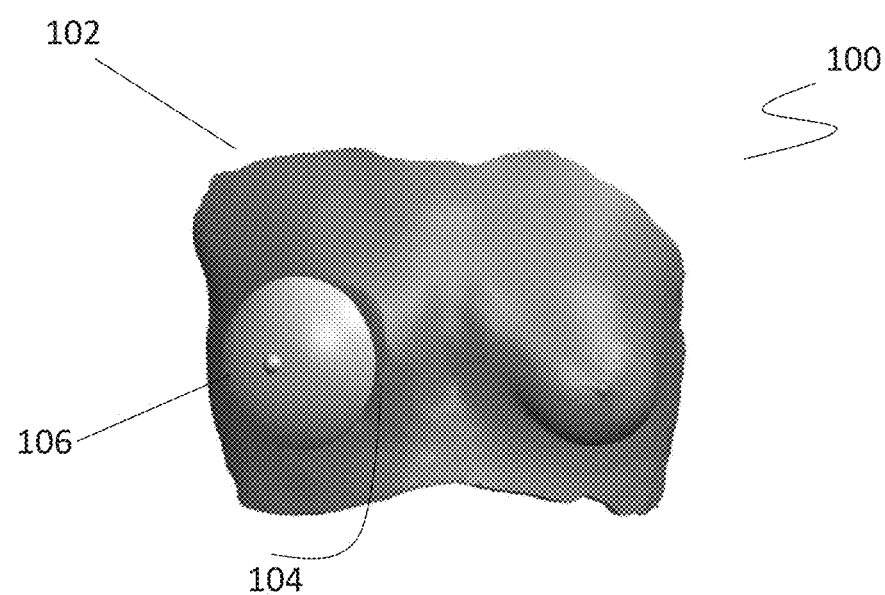
Figure 1C:
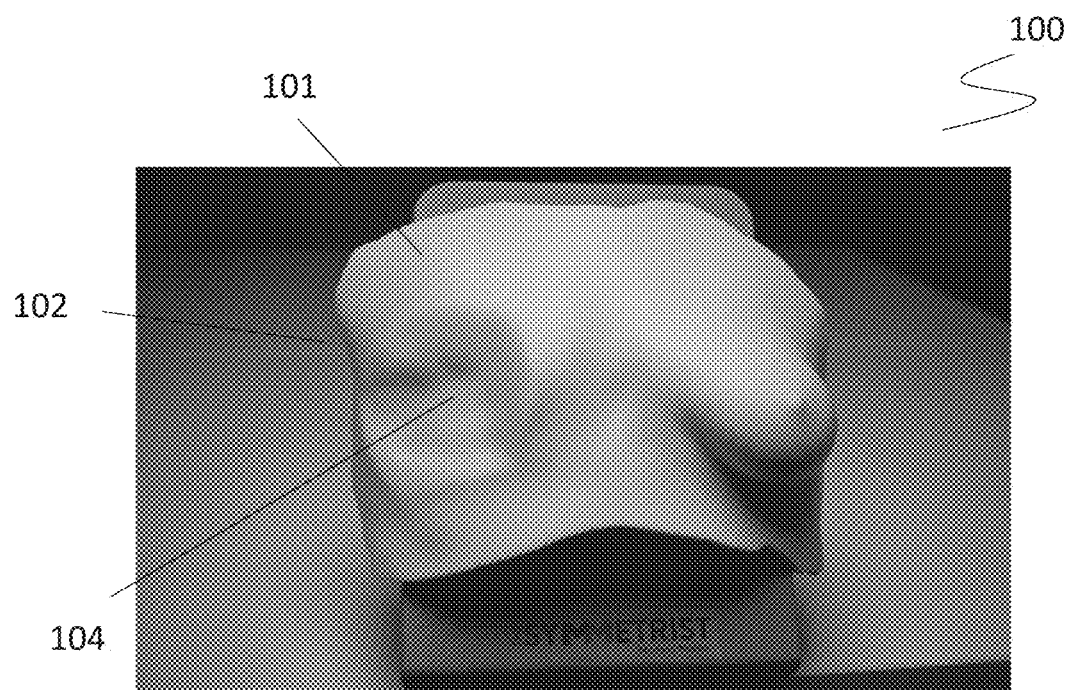
Figure 1D:
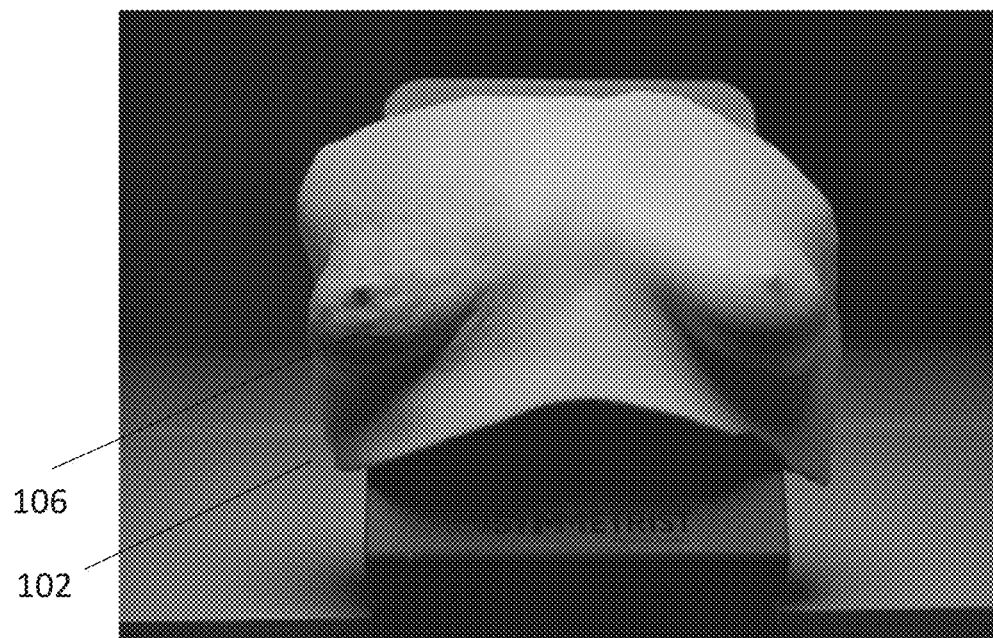

The anatomical models may include a three-dimensional replica of any body part or any simulated anatomical component suitable for medical training, surgical planning, or patient demonstration. In one variation, the three-dimensional replica may be a human female torso and the simulated anatomical component may be a breast. For example, referring to FIGS. 1A-1D, an anatomical model (100) that is a three-dimensional replica of a human female torso (102) is shown. In FIG. 1A, torso (102) resembles a post-operative mastectomy deformity and has an unfinished side (101) including a mounting area (104) for attachment of a simulated breast (106). FIG. 1A shows the simulated breast (106) unattached to the mounting area (104), and FIG. 1B shows the simulated breast (106) attached to the mounting area (104). The simulated breast (106) in FIGS. 1A and 1B may be removably attached to the mounting area (104) of torso (102). In another variation, as shown in FIGS. 1C and 1D, attachment of the simulated breast (106) may be achieved by sculpting the breast directly onto the mounting area (104). Similar to FIG. 1A, FIG. 1C provides a torso (102) resembling a post-operative mastectomy deformity having an unfinished side (101) that includes a mounting area (104). A simulated breast (106) may be sculpted on the mounting area (104) using clay to appear symmetrical with the other side, as shown in FIG. 1D. Use of these anatomical models may be beneficial for medical training, surgical planning and patient education, as previously stated.

Figure 2A:
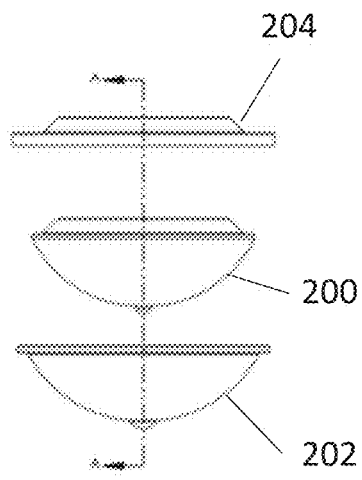
FIGS. 2A-2C depict an exemplary breast mold and elements for attaching a molded breast to an anatomical model.
Figure 2B:
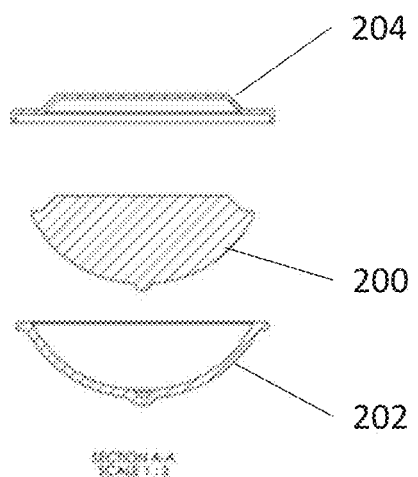
Figure 2C:
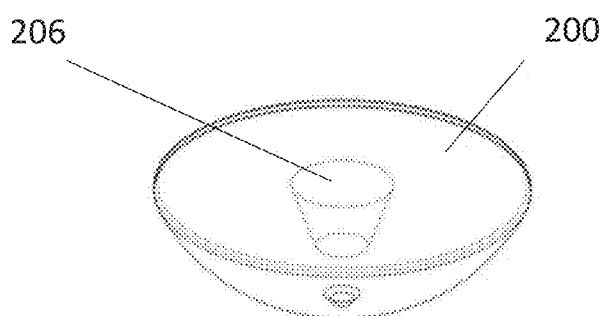

In some variations, as shown in FIGS. 2A and 2B, a simulated breast (200) may be formed from a material (e.g., modelling clay), using a mold (202). The simulated breast (200) may directly adhere to a base plate (204), which may then be coupled to a mounting area. This simulated breast may then be altered in a manner that would resemble potential surgical outcomes. FIG. 2A provides a side view of the mold (202), simulated breast (200), and base plate (204), while FIG. 2B provides a cross-sectional view of those components taken along line A-A in FIG. 2A. Alternatively, as shown in FIG. 2C, a mold (not shown) may create a hole or depression (206) in simulated breast (200) that mates with a corresponding structure (e.g., a peg) (not shown) fixed to a base plate.

In another variation, the three-dimensional replica may be a human face and the simulated anatomical component may be at least a portion of a nose, eye socket, or mouth. In yet another variation, the three-dimensional replica may be a human head and the simulated anatomical component, an ear. In further variations, the three-dimensional replica may be human hands or feet, and the simulated anatomical components may be one or more fingers or toes, respectively.

The dimensions of the anatomical models will generally vary based on the body part being modelled as well as the particular size and/or shape of the body parts of the patient from whom the model is generated. In some variations, when the anatomical model comprises a human female torso, the length of the torso may range from about 8.0 inches (20.3 cm) to about 16 inches (40.6 cm), including all values and sub-ranges in between. For example, the length of the torso may be about 8.0 inches (20.3 cm), about 9.0 inches (22.9 cm), about 10 inches (25.4 cm), about 11 inches (28.0 cm), about 12 inches (30.5 cm), about 13 inches (33.0 cm), about 14 inches (35.6 cm), about 15 inches (38.1 cm), or about 16 inches (40.6 cm). The width of the torso may range from about 10 inches (25.4 cm) to about 20 inches (50.8 cm), including all values and sub-ranges in between. For example, the width of the torso may be about 10 inches (25.4 cm), about 11 inches (28.0 cm), about 12 inches (30.5 cm), about 13 inches (33.0 cm), about 14 inches (35.6 cm), about 15 inches (38.1 cm), about 16 inches (40.6 cm), about 17 inches (43.2 cm), about 18 inches (45.7 cm), about 19 inches (48.3 cm), or about 20 inches (50.8 cm). The height of the torso may range from about 5.0 inches (12.7 cm) to about 10.0 inches (25.4 cm), including all values and sub-ranges in between. For example, the height of the torso may be about 5.0 inches (12.7 cm), about 6.0 inches (15.2 cm), about 7.0 inches (17.8 cm), about 8.0 inches (20.3 cm), about 9.0 inches (22.9 cm), or about 10 inches (25.4 cm). In one variation, the human female torso model has a height between about 5 inches (12.7 cm) to about 7.0 inches (17.8 cm). In another variation, the human female torso model has a length of about 8.5 inches (21.6 cm), a width of about 11 inches (27.9 cm), and a height of about 5.5 inches (14 cm).

The anatomical models may be used as a teaching tool for physicians and surgeons by visually demonstrating a variety of different conditions and procedures relating to breast augmentation, reconstruction, and/or tissue removal. The models may be useful when planning breast surgeries such as tumor removal with local tissue reconstruction, breast reduction, or breast augmentation or reconstruction. For example, the models may help a surgeon visualize and understand the outcome of using a round vs. other shaped implants in breast augmentation and reconstruction, as well as understand how to avoid and revise the most common breast implant malposition and sizing complications. As a teaching tool for patients, the model may be used to demonstrate breast implant complications, including but not limited to, malposition deformities, palpability, visibility, capsular contracture, over sizing and under sizing of breast implants, rotation of shaped implants, and the different appearance of round and shaped breast implants. The models may also incorporate anatomic tissue planes (e.g., muscular planes, fascial planes, etc.) in order to instruct surgeons on best practices for achieving optimal outcomes. These planes may be incorporated into various accessories (e.g., covers) that may be attached to the various models to create different clinical scenarios or situations that may be encountered.

The anatomical models may first be created by generating a cast of a living human or patient. The models may then be altered to simulate surgical intervention (such as mastectomy) or to create a deformity. In some variations, the anatomical models may simply provide a foundation for demonstrating various surgical procedures.

Once the cast is generated, it may be produced in other ways. For example, the cast may be formed by 3D printing or by creating a mold from the cast and then re-casting the model using different materials. The materials are generally durable and lightweight, and may have a surface that allows various materials to stick to it such as clay. However, simulated body parts such as a breast may be created with an attachment mechanism so that there may be interchangeable sizes and shapes to work with, as previously stated. In some variations, the models may be made by processes capable of mass production so that classes may be taught, not only for surgeons, but perhaps for artists, anatomists, etc. Additionally, the models may be used in conjunction with large workshops or they may be used as home study tools in conjunction with online teaching courses.

Bases

The anatomical models may be attached to a working surface using a base. Working surfaces may include, for example, a working bench, a table, a counter-top, or other solid surface. In some variations, the anatomical models may be attached to a working surface using an integrated base configured such that the torsos are attached to the base, and the base is attached to a working surface. In other variations, the base may comprise two parts, a bottom plate that may be fastened to the working surface, and a top plate that attaches to the anatomical model. The top plate generally includes attachment mechanisms for securing the anatomical model in place. These attachments may be used to interchange various models onto the top plate, and may include without limitation, screws, removable adhesive, Velcro® fasteners, magnets, hooks, and any other suitable male-female type couplers. Any number of attachments may be employed to secure the anatomical model to the base. For example, one, two, three, or four attachments may be used. In one variation, four screws are used to secure the anatomical model to the base. Additionally, the attachment mechanisms may be spaced in any suitable fashion upon the base.

The base may be made from various materials. Polymers such as thermoforming polymers or those used in injection molding may be used. Additionally, metals may be used. Exemplary polymer materials that may be employed include without limitation, acrylic, acrylonitrile butadiene styrene (ABS), polyamide, polycarbonate, polyester, polyethylene, polypropylene, polystyrene, polyurethane, or derivatives or combinations thereof. Examples of metal materials include, but are not limited to, aluminum, steel, and alloys thereof. In one variation, the base is made from polycarbonate. In other variations, the base is made from wood. In some variations, polycarbonate sheets that are heated and then bent at one end are used to form the base. In yet further variations, the base is made from sheet metal (e.g., aluminum sheets that are bent to form the base).

The base may have various dimensions and be provided in various shapes. For example, the base may be shaped as a rectangle, square, triangle, circle, or an oval. When provided as a rectangle or square, the top plate of the base may have a length ranging from about 10 inches (25.4 cm) to about 24 inches (70 cm), a width ranging from about 8.0 inches (20.3 cm) to about 20 inches (50.8 cm), and a height ranging from about 4.0 inches (10.2 cm) to about 6.0 inches (15.2 cm). In one variation, the base is rectangular in shape and has a top plate with a length of about 11 inches (30 cm), a width of about 8.0 inches (20.3 cm), a height of about 6.0 inches (15.2 cm), and a thickness of about 0.25 inches (0.64 cm). The bottom plate may also have the same shape and the same or similar dimensions as the top plate.

The top and bottom plates may be connected to one another by a hinge that pivots the top plate with respect to the bottom plate, and a mechanism that allows the angle between the top and bottom plates to be adjusted by a user. The adjustment mechanism may modify the viewing angle of the anatomical model to that desired by the user. In one variation, the angle between the top and bottom plates may be adjusted by a ratchet assembly, e.g., a ratcheting headrest. In a further variation, a telescoping tube with a removable pin may be coupled to the top and bottom plates for adjusting the angle therebetween.

Figure 3A:
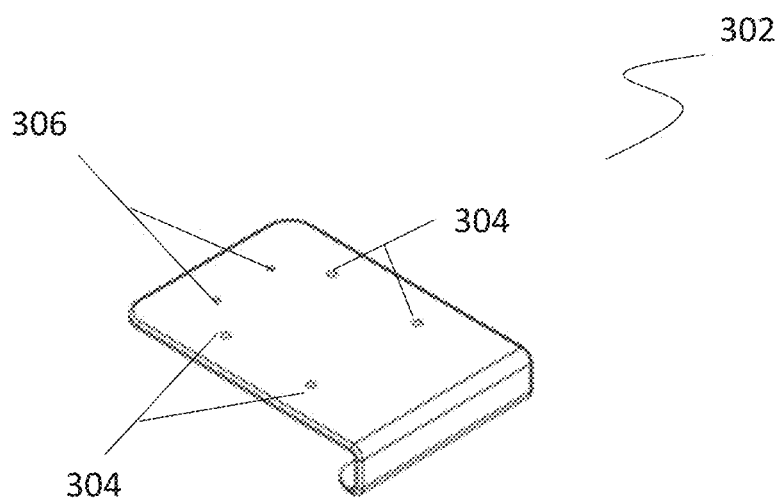
FIGS. 3A-3E depict an exemplary adjustable base for attachment of an anatomical model.
Figure 3B:
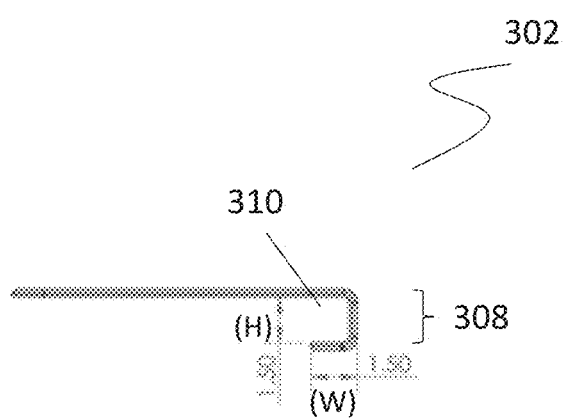
Figure 3C:
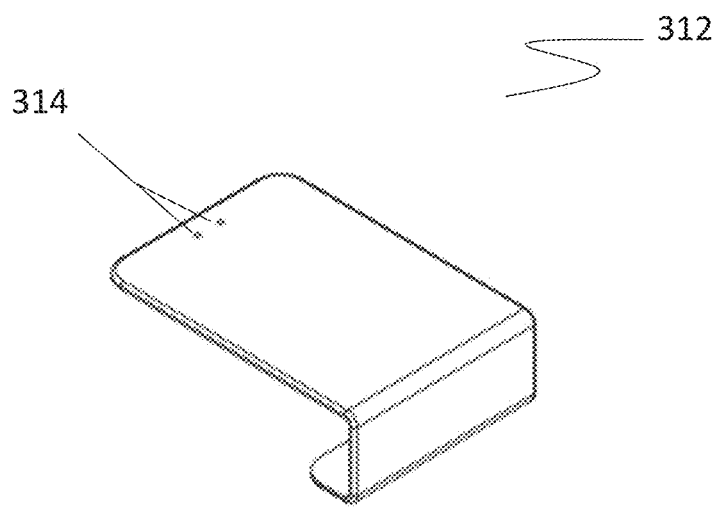
Figure 3D:
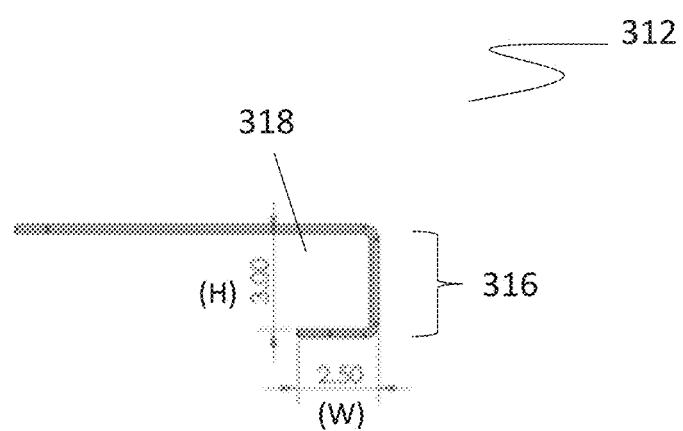
Figure 3E:
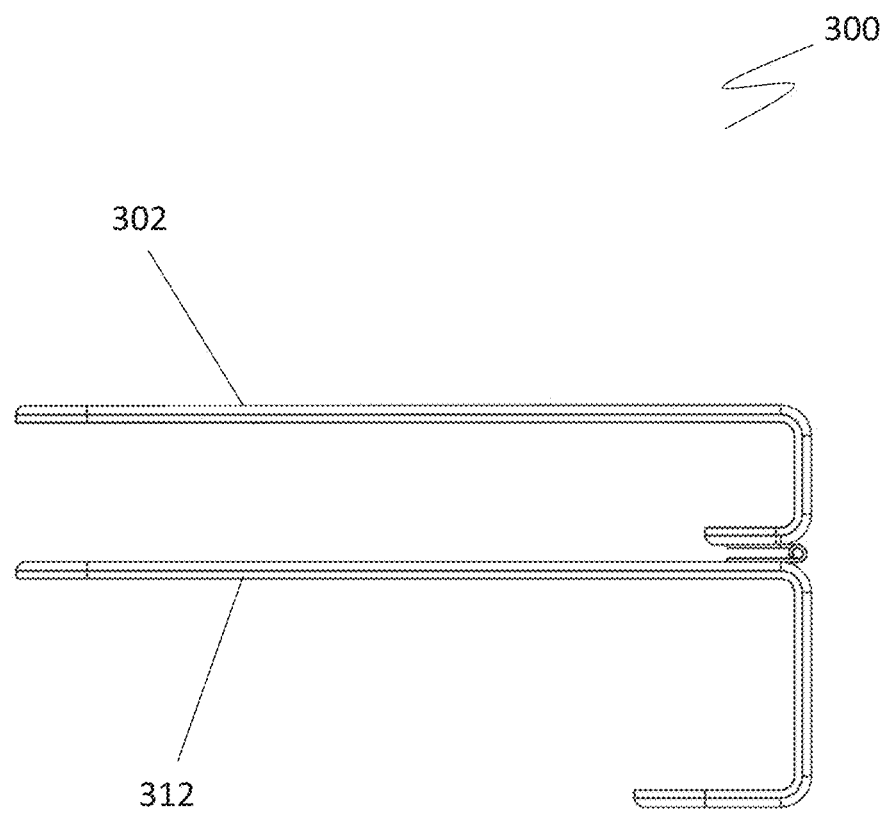

Referring to FIGS. 3A-3E, top and bottom plates of an exemplary base are shown. In FIG. 3E, a side view of a base (300) is shown having a top plate (302), a bottom plate (312), and a hinge (301) therebetween. In FIG. 3A, top plate (302) has four inserts (304) for receiving screws that removably secure the anatomical model to the base. Openings (306) are also provided for attachment of a first end of a mechanism (see, e.g., FIGS. 7A-7E) for adjusting the viewing angle of an anatomical model. As shown in the cross-sectional view of FIG. 3B, a lip (308) at one end of top plate (302) forms a space (310) that allows the top plate (302) to be spaced from a bottom plate of the base (300). The height (H) of the lip (308) may be about 0.5 inches (1.30 cm), as shown in FIG. 3B. However, in general, the height of the lip may range from about 0.5 inches (1.30 cm) to about 2.0 inches (5.10 cm), including all values and sub-ranges in between. For example, the height may be about 0.5 inches (1.30 cm), about 1.0 inch (2.54 cm), or about 1.5 inches (3.81 cm). Referring back to FIG. 3B, the width (W) of the lip (308) may be about 1.5 inches (3.81 cm). However, in general, the width of the lip may range from about 0.5 inches (1.30 cm) to about 2.0 inches (5.10 cm), including all values and sub-ranges in between. For example, the width of the lip may be about 0.5 inches (1.30 cm), about 1.0 inch (2.54 cm), or about 1.5 inches (3.81 cm).

In FIG. 3C, a bottom plate (312) is shown including openings (314) for attachment of a second end of a mechanism for adjusting the viewing angle of an anatomical model (see, e.g., FIGS. 7A-7E). As shown in the cross-sectional view of FIG. 3D, a second lip (316) at one end of bottom plate (312) forms a second space (318) to allow for a working surface such as a tabletop to be inserted therein and clamped. The height (H) of the second lip (316) may range from about 0.5 inches (1.30 cm) to about 4.0 inches (10.2 cm), including all values and sub-ranges in between. For example, the height of the second lip may be about 0.5 inches (1.30 cm), about 1.0 inch (2.54 cm), about 2.0 inches (5.10 cm), about 3.0 inches (7.6 cm), or about 4.0 inches (10.2 cm). In one variation, the height of the second lip may be about 3.0 inches (7.6 cm), and the width (W) of the second lip (316) may be about 2.5 inches (6.4 cm).

Figure 4:
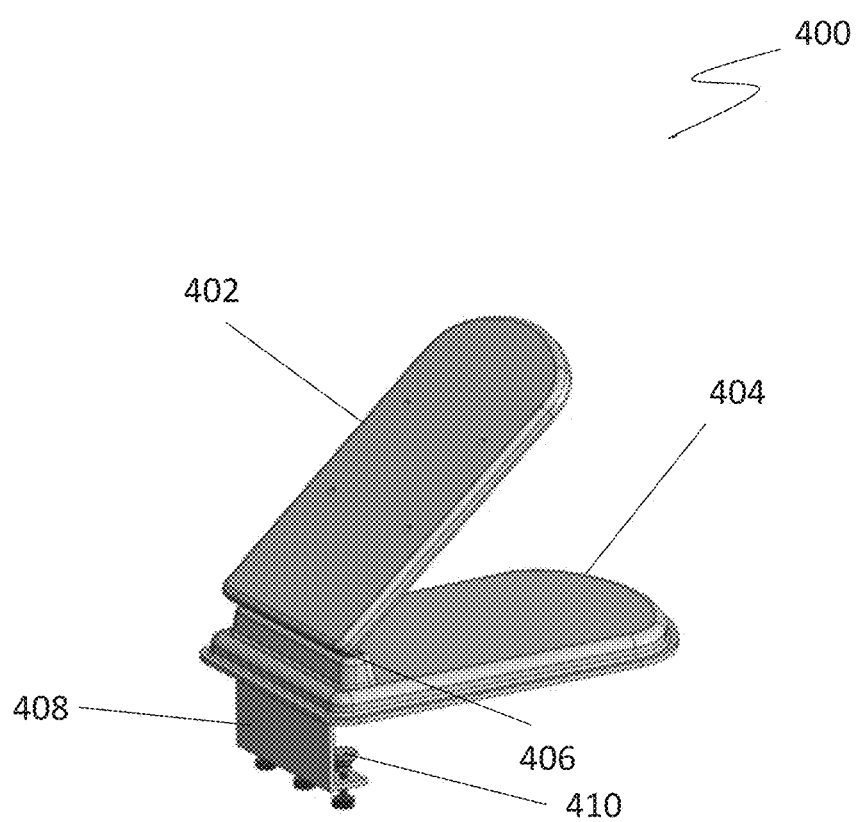
FIG. 4 depicts another exemplary adjustable base of the system.

In another variation, as shown in FIG. 4, another exemplary base (400) is shown. Base (400) includes a top plate (402) and a bottom plate (404). Bottom plate (404) includes a channel (406) that may be used to adjust the angle of top plate (402), which in turn may adjust the viewing angle of an anatomical component. Here the gap or space provided by channel (406) may allow the angle of the top plate to be adjusted (e.g., to create a smaller or larger angle with the bottom plate (404) at its connection with the bottom plate (404)). Base (400) may also include a clamp (408) into which an end of a working surface may be placed, and through which a screw (410) may be tightened to secure the working surface within the clamp (408). The top and bottom plates may be thermoformed plastic sheets, and the channel may be an extruded aluminum channel.

The base may be made by various processes. In one variation, the base may be manufactured from a polycarbonate sheet. The sheet may be cut to size and then the corners rounded. Holes may be drilled and heat-set threaded inserts placed therein in desired positions in the base. Next, the sheet may be formed using a hot wire and bending jig. Other manufacturing techniques such as thermoforming, injection molding, or sheet metal forming may also be employed.

In some variations, the anatomical model comprises a cover that may be removably secured to at least a portion of the anatomical model. The cover may include a mounting area in an altered, unfinished, or deformed state, which may be configured for completion or reforming by attaching a simulated anatomical component of a body part to the mounting area. The simulated anatomical component may represent a human anatomical component, and will typically depend on the body part for which the replica is being made. For example, the simulated anatomical component may be a breast, an ear, a nose, a jaw, fingers, toes, etc. Other simulated anatomical components may be used.

The cover may take various forms. For example, the cover may be a single layer of material or may comprise multiple layers of material. The single or multiple material layers may be made to represent the various tissue layers, for example, of a human body part or anatomical area. The layers may represent, skin, subcutaneous fat, breast tissue, muscle, etc. In one variation, the cover may be made from one or more thermoplastic polymers. Exemplary thermoplastic polymers include without limitation, acrylic, acrylonitrile butadiene styrene (ABS), polyamide, polycarbonate, polyester, polyethylene, polypropylene, polystyrene, polyurethane, or combinations thereof. Other materials such as silicones and rubbers may also be used. When the simulated anatomical component is sculpted onto the mounting area, the component may be made from a clay-based or other malleable material. The clay-based material may be a polymer clay (modelling clay), a water-based clay, or an oil-based clay.

Figure 9A:
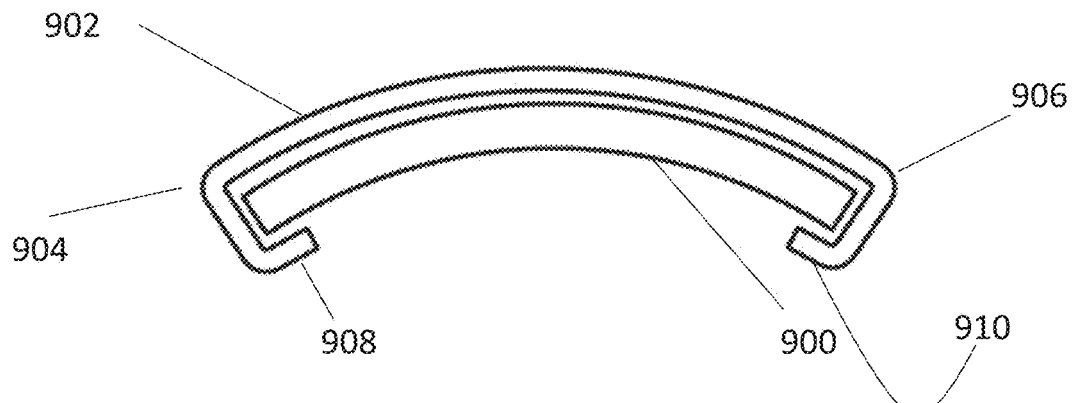
FIGS. 9A-9B depict a side, cross-sectional view of an exemplary cover for an anatomical model.
Figure 9B:
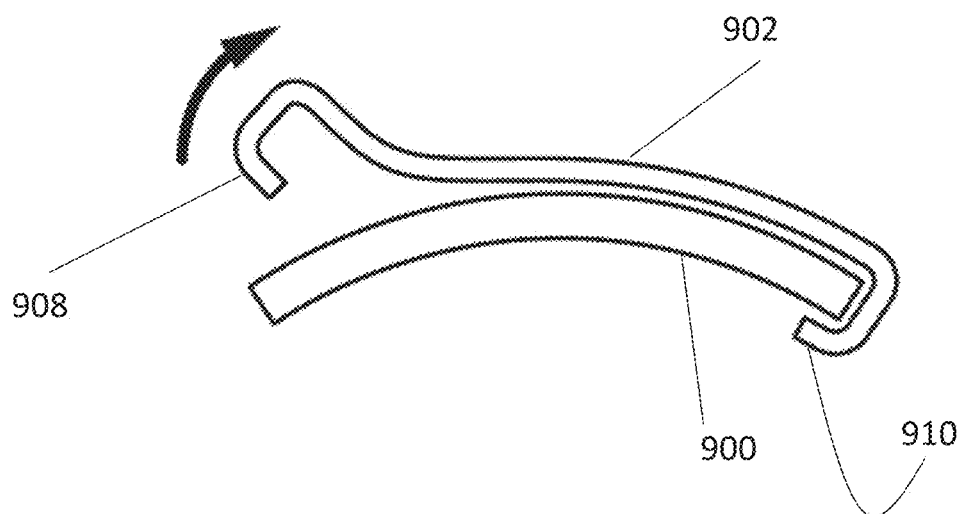

In some instances, one or more layers of the cover may include a lip to aid in removably securing the cover to the anatomical model. The lip may be provided on one or more edges of the cover, and may run continuously about the edge of the cover or discontinuously about the edge (e.g., there may be intervals or gaps between multiple lips). When disposed in a discontinuous fashion about the edge, any number of lips may be provided, and they may have any suitable length capable of removably securing the cover to the anatomical model. For example, referring to FIG. 9A, an anatomical model (900) includes a cover (902) thereon having a first edge (904) and a second edge (906). First edge (904) includes a first lip (908) and second edge (906) includes a second lip (910). First and second lips (908, 910) wrap around portions or ends of the anatomical model (900) to secure the cover (902) thereon. To remove the cover (902), first lip (908) may be lifted and peeled off of an end of the anatomical model (900), as shown in the direction of the arrow in FIG. 9B. Although the cover in FIGS. 9A and 9B is shown as having lips, other mechanisms for removable attachment of the cover may be used. For example, hooks, snaps, or Velcro may be used.

Figure 10:
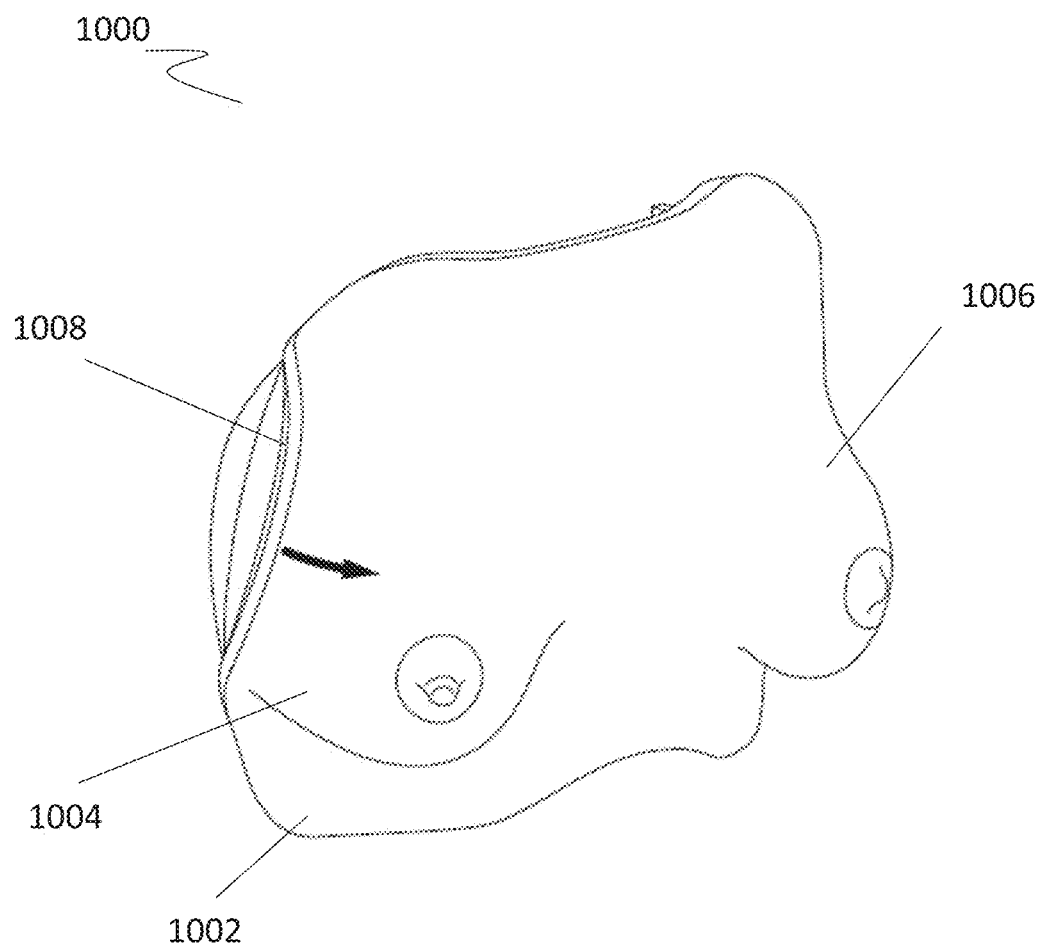
FIG. 10 depicts an exemplary cover representative of the anatomy for a female torso.
Figure 11A:
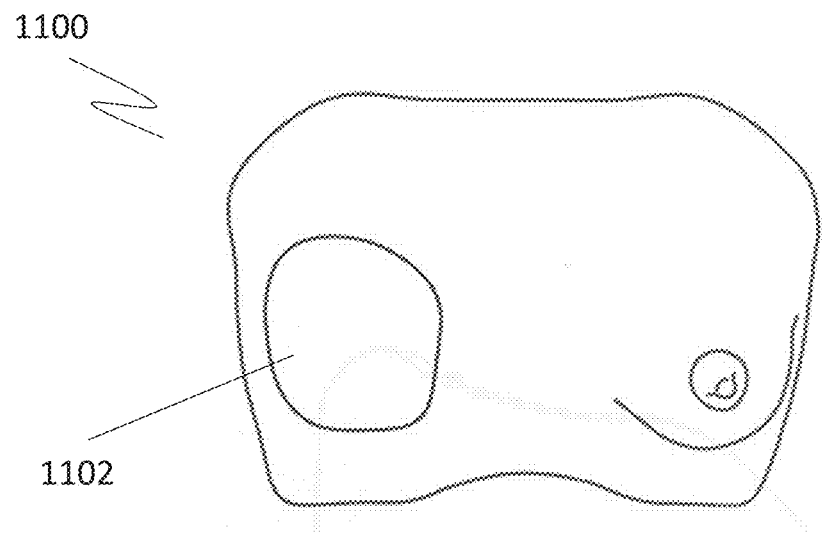
FIG. 11A depicts an exemplary cover of a female torso including a mounting area in an unfinished state.
Figure 11B:
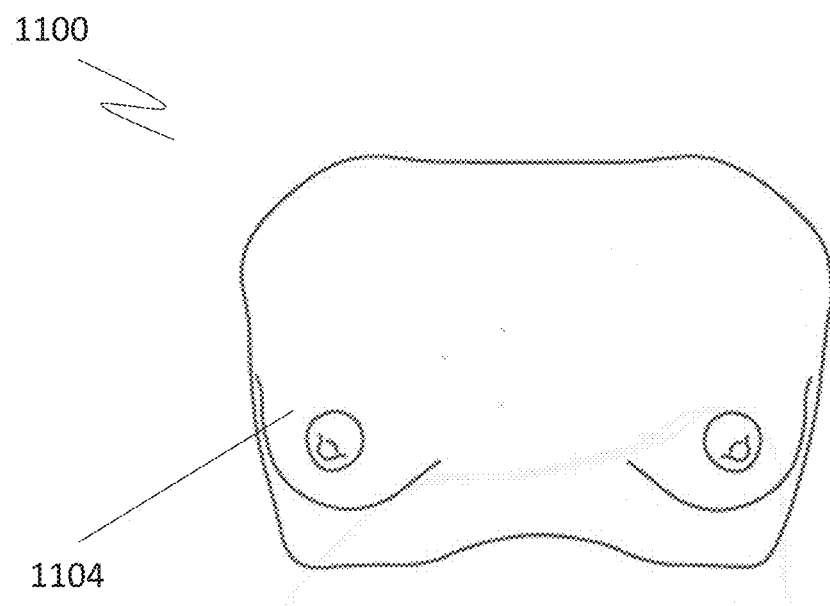
FIG. 11B depicts the cover of FIG. 11A in a finished state.

Referring to FIG. 10, when the anatomical model (1000) simulates a female torso, the cover (1002) may include breasts (1004, 1006). The cover (1002) may include a lip (1008) such that the cover (1002) may be removed from the anatomical model (1000) in the direction of the arrow. After a cover is removed, it may be replaced with the same cover or a different cover (e.g., a cover including different anatomy). In one variation, as shown in FIG. 11A, the cover of a female torso (1100) may be provided with a mounting area (1102) in an unfinished state to resemble a single mastectomy (one breast removed). A simulated breast (1104) may be attached or sculpted onto the mounting area (1102) as previously described so that the breasts on the model (1100) are symmetrical, as shown in FIG. 11B. The creation of symmetry may include sculpting the simulated breast (1104) to have a similar size, shape, and/or position on the anatomical model (1100) as the corresponding breast on the anatomical model (1100).

Figure 12A:
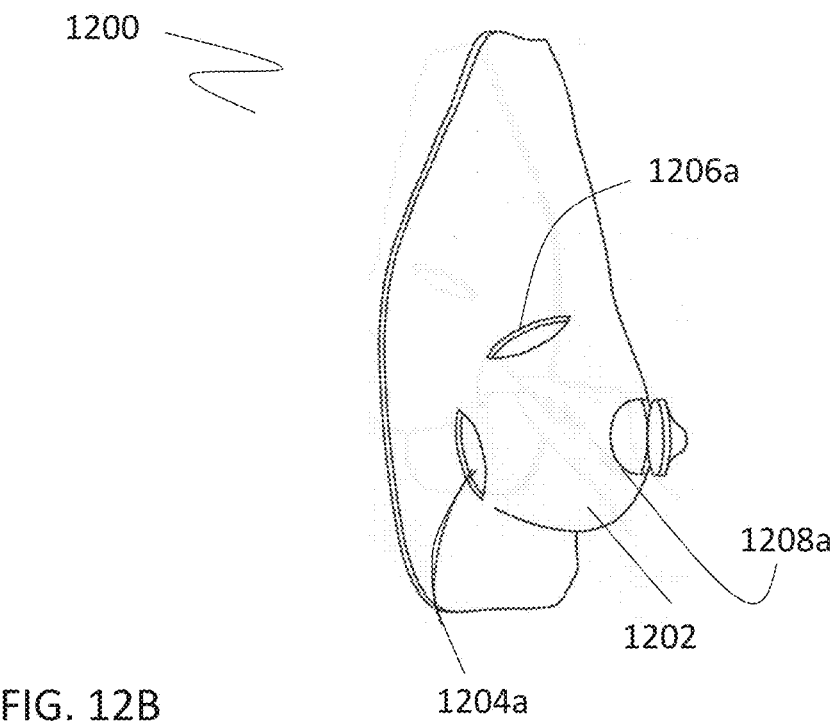
FIGS. 12A-12D illustrate how an exemplary female torso may be used as a teaching tool for breast surgery.
Figure 12B:
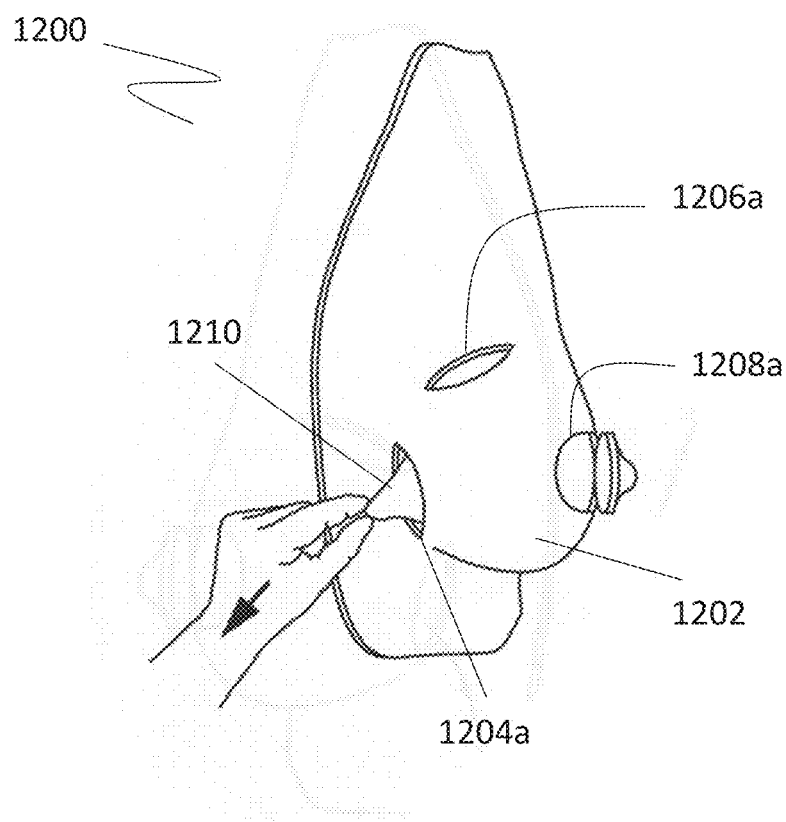
Figure 12C:
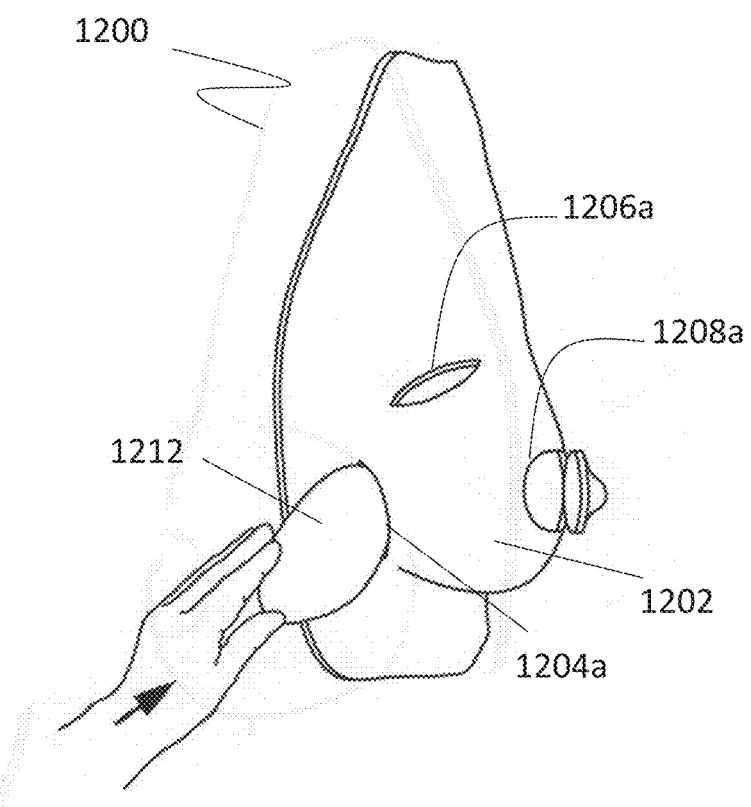
Figure 12D:
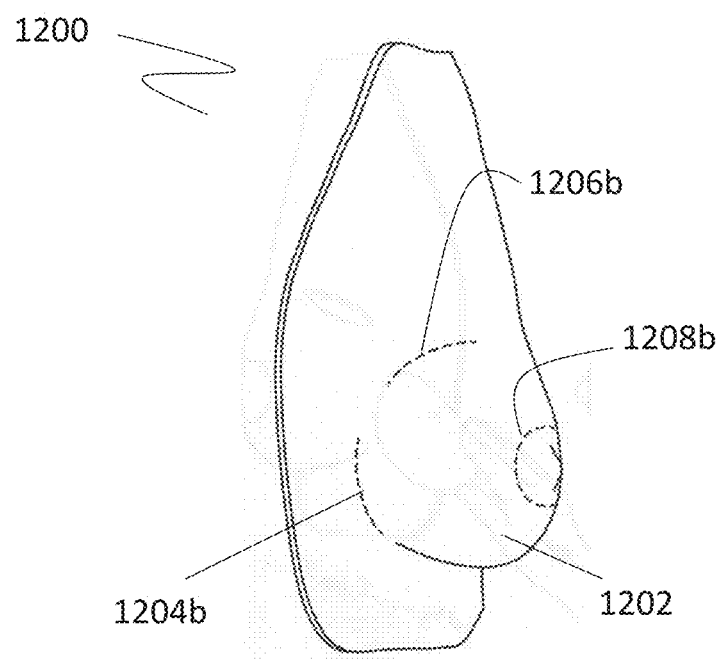

As previously stated, the anatomical models may be used as a teaching tool for physicians and surgeons by visually demonstrating a variety of different conditions and procedures relating to breast augmentation, reconstruction, and/or tissue removal. The models may be useful when planning breast surgeries such as tumor removal with local tissue reconstruction, breast reduction, or breast augmentation or reconstruction. For example, the models may help a surgeon visualize and understand incision placement and the outcome of using a round vs. other shaped implants in breast augmentation and reconstruction, as well as understand how to avoid and revise the most common breast implant malposition and sizing complications. For example, as shown in FIGS. 12A-12D, an anatomical model representative of a female torso (1200) may be used as a teaching tool to demonstrate and understand incision placement (FIGS. 12A and 12D), tissue removal (FIG. 12B), and breast augmentation (FIG. 12C). Referring to FIG. 12A, various incisions may be demonstrated in a breast (1202) of female torso model (1200). A lateral incision (1204a), upper lateral incision (1206a), and incision around the areola (1208a) may be made. Closure of those incisions may then be performed, as indicated by the dotted lines (1204b, 1206b, and 1208b) in FIG. 12D, and assessment performed of how the contour of the breast (1202) is affected by closure of the incisions in those positions. Prior to closure, tissue (1210) may removed from lateral incision (1204a), as illustrated in FIG. 12C, and a breast implant (1212) inserted into the breast (1202). The female torso (1200) may be formed to include the various tissue layers representative of human anatomy in the area, e.g., breast tissue, skin, subcutaneous tissue, pectoralis muscle, etc.

Systems

The systems described herein generally include an anatomical model, an adjustable base to which the anatomical model is attached, and one or more simulated anatomical components for removable attachment to the anatomical model, or one or more materials that may be used to create a simulated anatomical component of the body part, and instructions for use. One or more covers, as described herein, may also be included. The covers may include a mounting area in an altered, unfinished, or deformed state, which may be configured for completion or reforming by attaching a simulated anatomical component of a body part to the mounting area. In some instances, the one or more covers may include a plurality of layers representative of the various tissue layers of a human body part or anatomical area, e.g., breast tissue, skin, subcutaneous tissue, pectoralis muscle, etc.

In some variations, the systems for modeling a body part may include an adjustable base and a three-dimensional replica of the body part for coupling to the adjustable base, where the three-dimensional replica may include a mounting area in an unfinished or deformed area of the three-dimensional replica. The systems may further include a mechanism for altering the angle of the adjustable base with respect to a working surface, for example, a hinge, ratcheting mechanism, or telescoping tube. The body part may be a female torso and the simulated anatomical component, a breast. The anatomical models may also include other body parts and simulated anatomical components.

In other variations, the system includes one or more simulated anatomical components for removable attachment to the anatomical model. When a plurality of simulated anatomical components are employed, they may have different shapes, sizes, volumes, etc. For example, when the simulated anatomical component is a breast, as shown in FIGS. 1A, 1B, and 2A-2C, the simulated breast may be provided in various shapes, sizes, and volumes.

In variations where one or more materials are packaged in the system and used to create a simulated anatomical component, the simulated anatomical component may be directly sculpted onto a mounting area of the body part, or coupled to the mounting area or body part via a base plate. When a plurality of materials are included, they may be packages of the same material or packages of different materials. For example, some packages may include a polymer clay (modelling clay) while others may include an oil-based clay. One or more base plates may also be included in the systems.

Figure 5A:
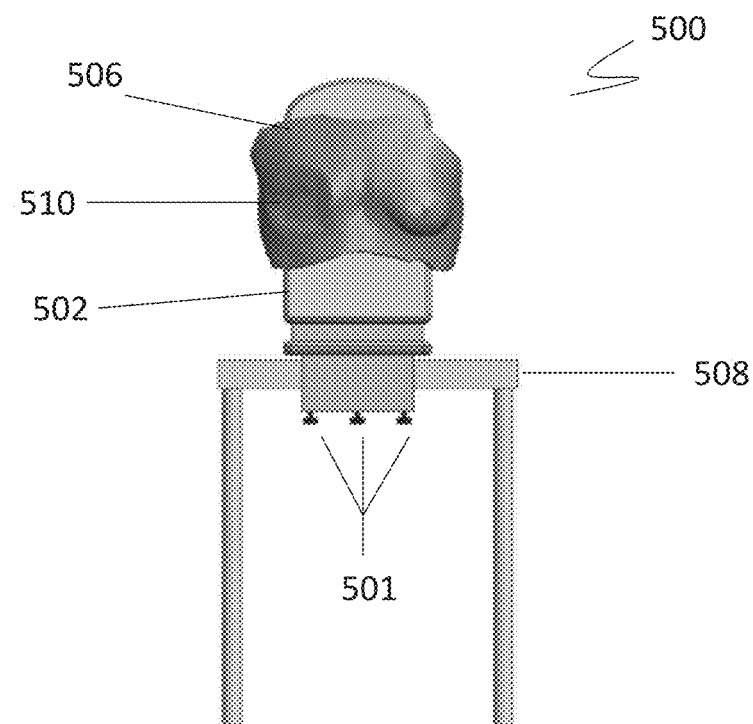
FIGS. 5A and 5B depict an exemplary system including an anatomical model.
Figure 5B:
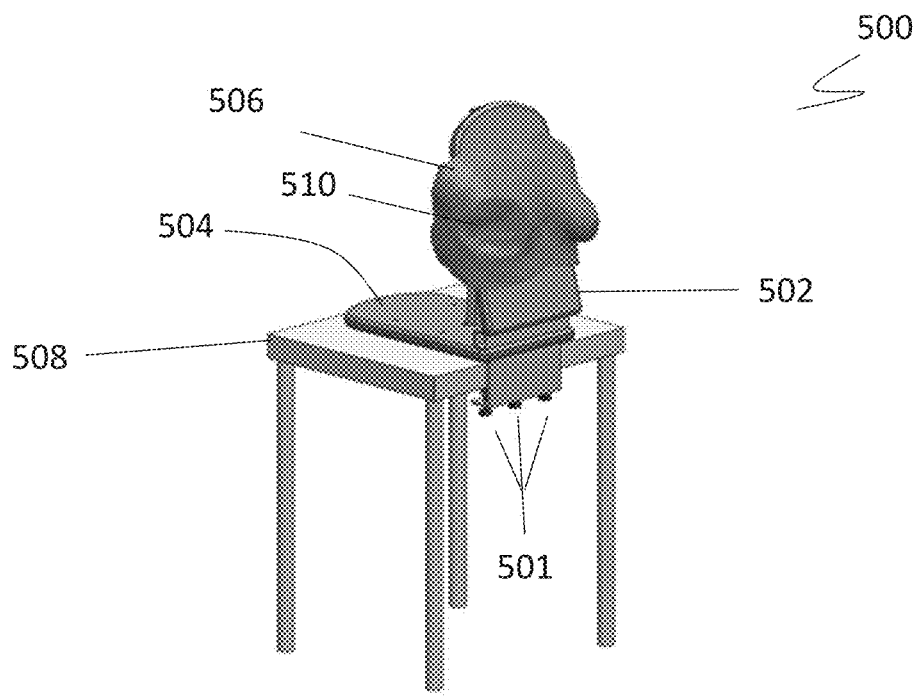
Figure 6A:
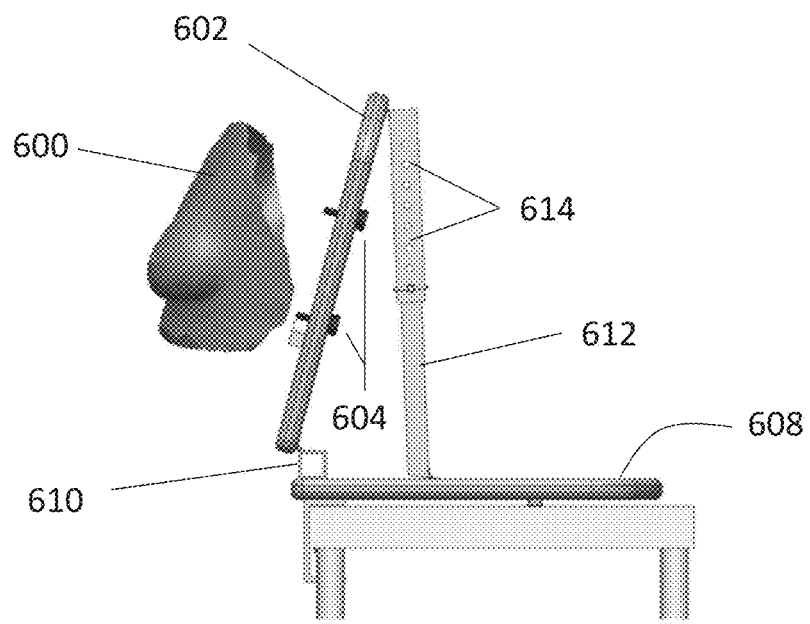
FIGS. 6A and 6B depict an exemplary mechanism including a telescoping tube for adjusting the viewing angle of an anatomical model.
Figure 6B:
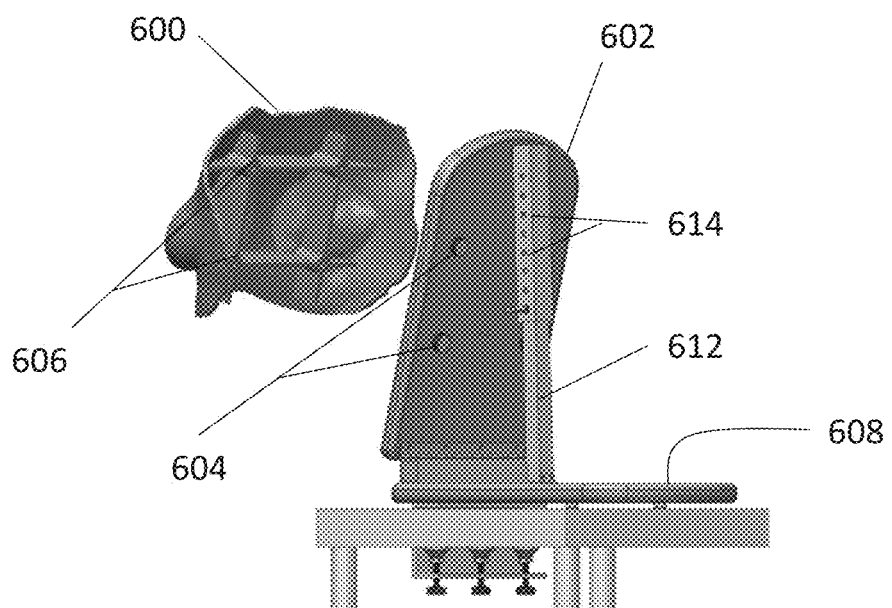
Figure 6C:
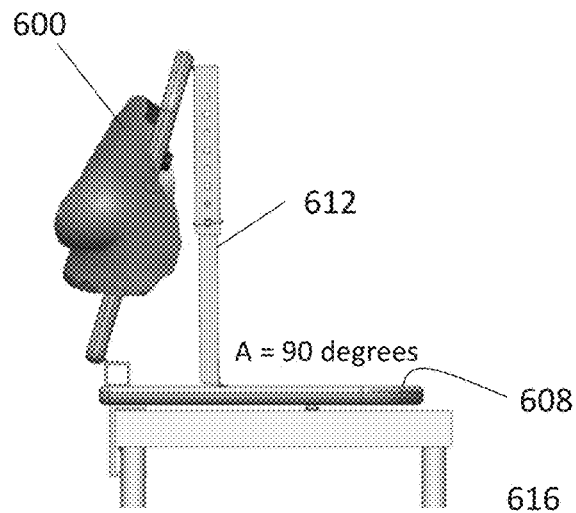
FIGS. 6C-6F show how adjustment of the telescoping tube varies the viewing angle of the anatomical model with respect to a working surface.
Figure 6D:
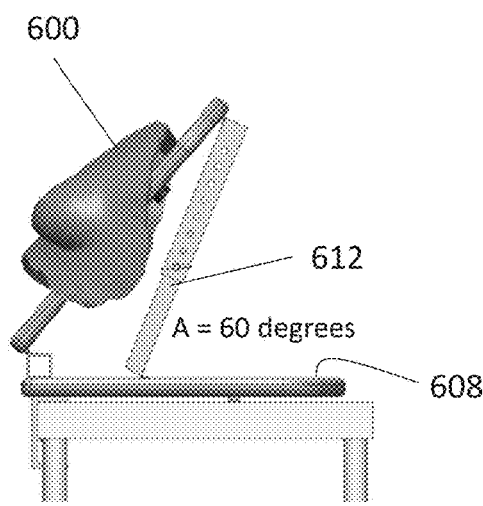
Figure 6E:
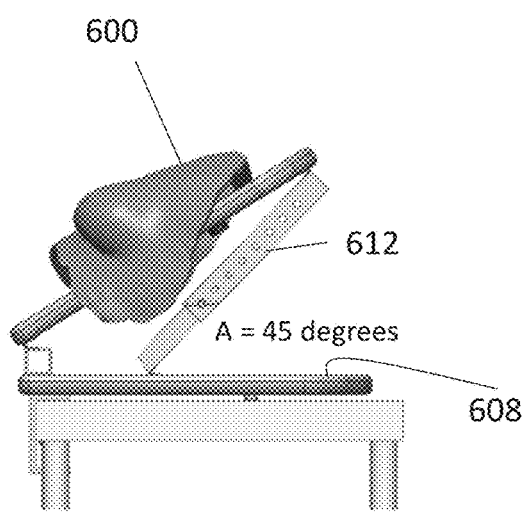
Figure 6F:
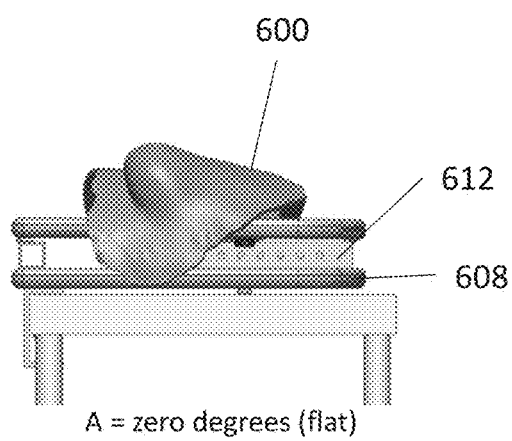

FIGS. 5A and 5B show an exemplary system attached to a tabletop working surface. System (500) includes a base comprising a top plate (502) and a bottom plate (504), and an anatomical model (506) coupled to the top plate (502) of the base. The bottom plate (504) is secured to the working surface (508) by tightening knobs (501). The anatomical model (506), which is a three-dimensional replica of a human female torso, includes a mounting area (510) for placement of a simulated breast. Although a female torso and breast are shown in the figures, it is understood that other body parts for the anatomical model and other simulated anatomical components may be used.

The systems may also include a mechanism for adjusting the viewing angle of the anatomical model. For example, a hinge, ratchet assembly, or telescoping tube and pin arrangement may be used to adjust the angle between the top and bottom plates of the base, as previously mentioned. Referring to FIGS. 6A-6F, a telescoping tube arrangement is illustrated. In the figures, anatomical model (600) may be secured to a top plate (602) of a base by screws (604). Screws (604) run through top plate (602) to mate with threaded inserts (606) on the back of anatomical model (600). Although only two screws and threaded inserts can be seen, the system includes four screws and threaded inserts. Any suitable number of screws and threaded inserts may be employed. Top plate (602) may be coupled to the bottom plate (608) of the base by a surface mount hinge (610) with or without a spring.

Once the anatomical model (600) is coupled to the top plate (602) of the base, the height of a telescoping tube (612) attached to the top plate (602) and bottom plate (608) may be adjusted to the thereby adjust the viewing angle of the anatomical model (600). A pin (not shown) may be placed through holes (614) in the telescoping tube (612) to hold the tube (612) at a certain height, and in turn, stabilize the viewing angle of the anatomical model (600). Referring to FIGS. 6C to 6F, adjustment of the viewing angle is illustrated by adjusting the height of the telescoping tube. As shown in the figures, as the height of the telescoping tube (612) decreases, the angle (A) between the telescoping tube (612) and the bottom plate (608) as well as the working surface (616) decreases, which in turn decreases the viewing angle of the anatomical model (600). The angle (A) between the telescoping tube (612) and bottom plate (608) or working surface (616) may be adjusted from about 90 degrees (FIG. 6C), to about 60 degrees (FIG. 6D), to about forty-five degrees (FIG. 6E), to zero degrees (FIG. 6F) (so that the telescoping tube is flat/flush with the bottom plate), or to any sub-angle therebetween. Although a female torso is shown in the figures, it is understood that other body parts for the anatomical model may be used.

Figure 7A:
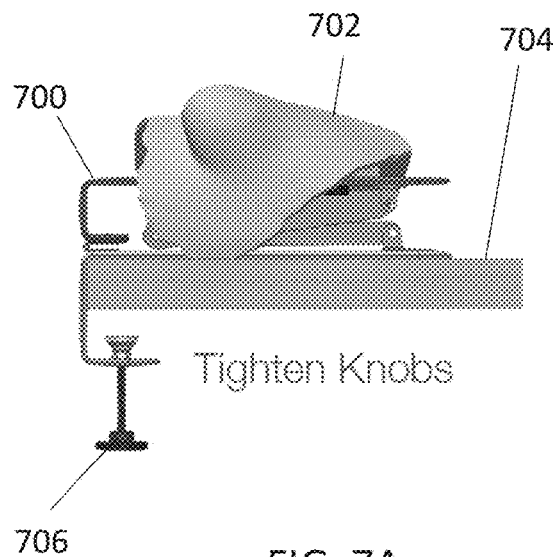
FIGS. 7A-7D depict another exemplary mechanism for adjusting the viewing angle of an anatomical model.
Figure 7B:
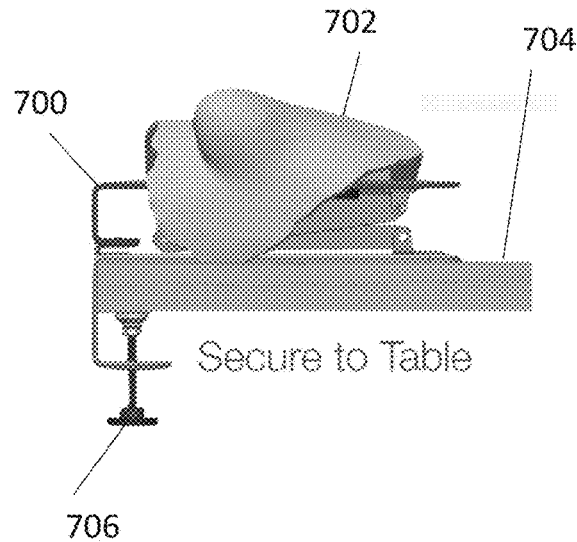
Figure 7C:
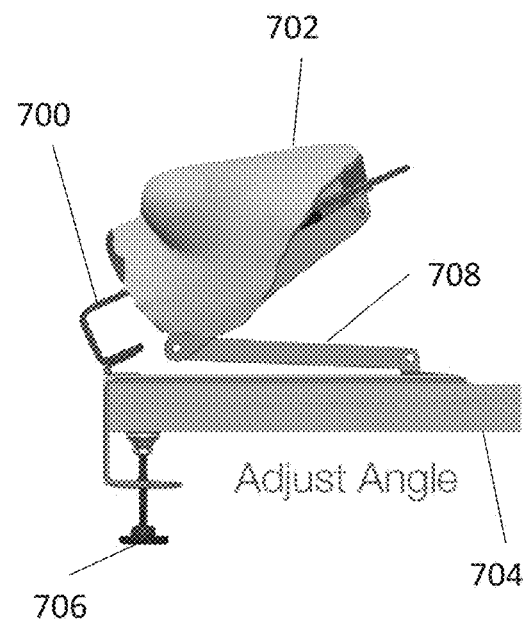
Figure 7D:
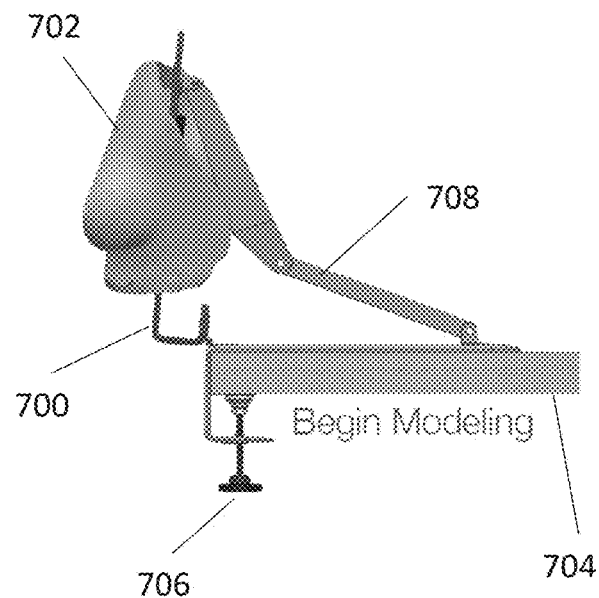

In another variation, as illustrated in FIGS. 7A-7D, the viewing angle may be adjusted using a ratchet assembly (708). In this variation, the base of the system with an anatomical component removably attached thereto would first be secured to a working surface. For example, as shown in FIGS. 7A and 7B, the base (700) with an attached anatomical model (702) is secured to a working surface (704) by tightening knobs (706). As shown in FIGS. 7C and 7D, the viewing angle may then be adjusted by moving the ratchet assembly (708) toward the upright position such that it pivots from a flat position against the working surface (704) to the desired viewing angle. Once at the desired viewing angle, the ratchet assembly (708) locks the position of the anatomical model (702). Although a female torso is shown in the figures, it is understood that other body parts for the anatomical model may be used.

Methods

Further described herein are methods related to using the anatomical models for training and patient demonstration. In general, the methods may include creating a three-dimensional replica of a body part, where the three-dimensional replica includes a mounting area in an unfinished or deformed portion thereof. The replica may be completed or reformed by attaching a first simulated anatomical component of the body part to the mounting area. The simulated anatomical component may be a breast, but other anatomical components may be used. Alternatively, the methods may include securing a cover to the anatomical model that includes a mounting area in an unfinished or deformed state, which may be completed or reformed by attaching a simulated anatomical component of the body part to the mounting area. The cover may be replaced with a cover representing the same anatomical region or a different anatomical region.

In some instances, attachment of the first simulated anatomical component may be achieved by sculpting the component onto the mounting area. In one variation, sculpting may comprise creating symmetry between a first sculpted simulated breast and the corresponding breast on a three-dimensional replica. The creation of symmetry may include sculpting the first simulated breast to have a similar size, shape, or position on the replica as the corresponding breast on the replica, or a combination thereof.

In other instances, the method may include interchanging the first simulated anatomical component with a second simulated anatomical component having a different size, a different shape, or a combination thereof. For example, when the system includes a plurality of different simulated anatomical components, each may have a different size and/or shape. The different simulated components may be interchanged or switched with another component to help visually train for recognition of symmetry, for demonstration, or for surgical planning.

In some variations, the anatomical models may be used during breast surgery planning. For example, the models may be used during planning for breast reconstruction, e.g., after mastectomy, breast reduction, breast augmentation, lumpectomy, surgery to correct breast deformity or scarring, etc. In other variations, the anatomical models may be used to visually train anatomical symmetry. In further variations, the anatomical models may be used for visual training relating to surgical incision placement, or for visual training relating to breast implant placement. Additionally, the anatomical models may be used for patient demonstration, as a tool to illustrate various procedures to achieve certain outcomes.

The training and demonstration models described herein may improve both patient and surgical education in plastic surgery, breast surgery, and other surgeries where anatomical symmetry or other aesthetics outcome is desired. Improved education of healthcare workers including but not limited to surgeons, nurses and others involved in patient care, may in turn lead to improved surgical outcomes and reduced reoperation rates. The anatomical models may function as a tool that provides patients with an improved educational experience that may help them become better informed and therefore better able to make informed consent.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to explain the principles of the invention and its practical applications, they thereby enable others skilled in the art to utilize the invention and various embodiments with various modifications as are suited to the particular use contemplated.

The invention claimed is:

1. An anatomical model for medical or surgical education and training, surgical planning, or patient demonstration comprising:
   a three-dimensional representation of a body part; and
   a mechanism configured to attach the three-dimensional representation of the body part to an adjustable base,
   wherein the three-dimensional representation of the body part comprises a deformed portion of the body part and is configured to be reformed by a user sculpting and attaching a malleable material onto the deformed portion of the three-dimensional representation of the body part, wherein the malleable material is sized or shaped by the user to symmetrically reform the three-dimensional representation of the body part.

2. The anatomical model of claim 1, wherein the body part comprises a human torso.

3. The anatomical model of claim 2, wherein the deformed portion comprises a breast.

4. The anatomical model of claim 1, wherein the malleable material comprises a polymer clay, a water-based clay, or an oil-based clay.

5. The anatomical model of claim 1, wherein the attaching of the malleable material onto the deformed portion of the three-dimensional representation of the body part is temporary.

6. The anatomical model of claim 1, wherein the three-dimensional representation comprises a removably securable cover.

7. The anatomical model of claim 6, wherein the removably securable cover comprises a plurality of layers representative of a plurality of tissue layers of the body part.

8. The anatomical model of claim 1, wherein the three-dimensional representation comprises a thermoplastic polymer.

9. The anatomical model of claim 8, wherein the thermoplastic polymer comprises acrylic, acrylonitrile butadiene styrene (ABS), polyamide, polycarbonate, polyester, polyethylene, polypropylene, polystyrene, polyurethane, or derivatives or combinations thereof.

10. An anatomical model for breast surgery training, planning, and demonstration comprising a three-dimensional representation of a female torso and a mechanism configured to attach the female torso to an adjustable base, wherein the three-dimensional representation of the female torso comprises a mounting area simulating a post-surgical deformity, and wherein the three-dimensional representation is configured for reformation by a user sculpting and attaching a simulated breast onto the mounting area to symmetrically reform the post-surgical deformity of the torso or the breast, wherein the simulated breast is created from a malleable material.

11. A system for modeling a body part comprising:
   an adjustable base;
   a three-dimensional representation of the body part for coupling to the adjustable base,
   wherein the three-dimensional representation of the body part comprises a deformed portion of the body part; and
   one or more malleable materials configured to be sculpted and attached onto the deformed portion of the three-dimensional representation of the body part to symmetrically reform the body part.

12. The system of claim 11, wherein the body part comprises a human torso.

13. The system of claim 12, wherein the deformed portion of the three-dimensional representation of the body part comprises a breast.

14. The system of claim 11, wherein the three-dimensional representation of the body part comprises a plurality of layers representative of a plurality of tissue layers of the body part.

15. The system of claim 11, wherein the one or more malleable materials comprises a polymer clay, a water-based clay, or an oil-based clay.

16. The system of claim 11, wherein the adjustable base comprises a ratcheting mechanism for altering the angle of the adjustable base with respect to a working surface.

17. The system of claim 11, wherein the adjustable base is configured for attachment to a working surface, the working surface comprising a bench, a table, or a countertop.

18. A method for medical or surgical education, training, surgical planning, or patient demonstration comprising:
providing a three-dimensional representation of a body part, the three-dimensional representation comprising a deformed portion of the body part and a mechanism configured to attach the body part to an adjustable base; and
symmetrically reforming the deformed portion of the body part by a user sculpting and attaching a malleable material onto the deformed portion of the three-dimensional representation.

19. The method of claim 18, wherein the three-dimensional representation of the body part comprises a torso, and the deformed portion of the three-dimensional representation of the body part comprises a breast.

20. The method of claim 19, wherein symmetrically reforming the deformed portion of the breast comprises sculpting and attaching a malleable material onto the deformed breast of the three-dimensional representation of the torso to have a similar size, shape, or position to the non-deformed breast on the torso.

21. The method of claim 18, wherein the three-dimensional representation of the body part comprises a removably securable cover.

22. The method of claim 21, wherein the removably securable cover comprises a plurality of layers representative of a plurality of tissue layers of the body part.

23. The method of claim 18, wherein the sculpted and attached malleable material is removably attached to the deformed portion of the three-dimensional representation of the body part.

* * * * *